United States Patent [19]

Klancher

[11] Patent Number: 5,734,576
[45] Date of Patent: Mar. 31, 1998

[54] METHOD AND APPARATUS FOR REMOTE TESTING OF COORDINATION OF OVERCURRENT PROTECTION DEVICES IN AN ELECTRICAL POWER SYSTEM

[75] Inventor: Frank Klancher, Upper St. Clair Township, Pa.

[73] Assignee: Eaton Corporation, Cleveland, Ohio

[21] Appl. No.: 577,578

[22] Filed: Dec. 22, 1995

[51] Int. Cl.$^6$ .................................................. H02H 43/093
[52] U.S. Cl. ............................ 364/483; 361/63; 324/424
[58] Field of Search ........................... 361/1, 93, 94, 361/97, 62, 63, 115, 64–66; 324/73.1, 424; 364/483, 481, 921.8, 943.9, 945.7; 340/310.01, 310.06, 638, 825.02

[56] References Cited

U.S. PATENT DOCUMENTS

| | | | |
|---|---|---|---|
| 4,245,318 | 1/1981 | Eckart et al. | 364/481 |
| 4,432,031 | 2/1984 | Premerlani | 364/483 |
| 4,468,714 | 8/1984 | Russell | 361/62 |
| 4,752,853 | 6/1988 | Matsko et al. | 361/94 |
| 5,367,427 | 11/1994 | Matsko et al. | 361/94 |
| 5,402,299 | 3/1995 | Bellei | 361/62 |
| 5,596,473 | 1/1997 | Johnson et al. | 361/64 |
| 5,627,716 | 5/1997 | Lagree et al. | 361/64 |

*Primary Examiner*—James P. Trammell
*Assistant Examiner*—Craig Steven Miller
*Attorney, Agent, or Firm*—Martin J. Moran

[57] ABSTRACT

Coordination of the overcurrent/time trip characteristics of a hierarchy of overcurrent protection devices is accomplished through a central tester which establishes a pattern of test currents for the individual overcurrent protection devices which simulates a fault at a specified location in the power system. The individual assigned test currents are transmitted over a communications link to the separate overcurrent protection devices where they are stored in memory. The central tester then broadcasts a test signal which simultaneously initiates testing of all of the overcurrent protection devices using the assigned test currents stored in memory. The trip times are recorded and reported back to the central tester for analysis.

6 Claims, 3 Drawing Sheets

METHOD AND APPARATUS FOR REMOTE TESTING OF COORDINATION OF OVERCURRENT PROTECTION DEVICES IN AN ELECTRICAL POWER SYSTEM

BACKGROUND OF THE INVENTION

1. Field of the Invention

This invention applies to coordination of overcurrent protection devices such as circuit breakers and protective relays in an electrical power system, and more particularly, to a method and apparatus for remotely testing such coordination.

2. Background Information

In a typical electric power distribution system, a main bus provides power to a number of additional buses which in turn energize a plurality of distribution circuits. Often, power transformers step down the voltage at various points in the system. Typically, overcurrent protection devices are provided in the main bus and in at least some if not all of the other branches of the distribution system. Each of the overcurrent protection devices has its own overcurrent/time trip characteristic for responding to faults in the power system. Typically these overcurrent time trip characteristics of the various overcurrent protection devices are coordinated through a hierarchical arrangement so that only the closest protection device above the fault trips to minimize the interruption to service. This coordination is commonly verified by plotting the time/current trip characteristics of the individual overcurrent protection devices on transparent paper and then overlaying the papers in hierarchial order to see that the curves for higher order devices are outside of those for devices lower in the hierarchy. Even though the proper coordination is verified in this manner, there could be errors in setting the devices in the prescribed manner. In some instances, actual coordination is tested by injecting fault current into the system at selected locations and observing which devices trip. This is a cumbersome test which can only be performed with the system disconnected from the power source, and hence, is typically only performed, if at all, during initial system testing.

In some installations, zone interlocks are used. In such an arrangement, overcurrent protective devices lower on the hierarchy which see an overload current send an interlock signal to a higher order device blocking generation of a trip signal by the latter to give the former time to react. This permits the time/overcurrent characteristics of adjacent overcurrent protective devices in the hierarchy to have their time/current trip characteristics set closer together, but assures that the lower device will trip first if conditions warrant. In some installations, the overcurrent protective devices in at least a portion of the distribution system, are controlled from a central panel board. Furthermore, it is common today for overcurrent protective devices to have digital trip units which incorporate a microprocessor. Many of these microprocessors are capable of communicating with a remote unit which can monitor the operation of the overcurrent protection devices, and in some instances control and/or change the parameter settings. There is a need for an improved method and apparatus for testing the coordination between protective devices in electric power systems.

There is a more particular need for such an improved method and apparatus which permits testing of the various protection devices distributed throughout the system from a common location.

There is also a need for such a method and apparatus which provides for the central accumulation of the results of such a test of coordination.

There is a further need for such a method and apparatus which verifies proper implementation of coordination without the need to inject current or actually trip the devices, so that, verification can be repeated at any time.

SUMMARY OF THE INVENTION

These needs and others are satisfied by the invention which is directed to centralized testing of the coordination between the various protection devices in an electric power system. This includes a central test station which can be a remote computer or a unit mounted in a panel board connected to the individual overcurrent protection devices by a communications link. The central test station performs simultaneous testing of the overcurrent protection devices using a pattern of assigned test currents simulating a fault at a specified location in the hierarchy of branches of the system. In the preferred embodiment, the central test means first sends the assigned currents to each of the protection devices for storage in a memory within the protection device. This can be accomplished by messages addressed to the individual overcurrent protection devices. The central testing means then broadcasts over the communications link to all of the protection devices a test signal which actuates test means within each of the overcurrent protection devices to implement a test of the trip means using the assigned test current stored in memory. The overcurrent protection devices then perform the protection functions implemented by their respective time/current trip characteristics. The time at which an overcurrent protection device trips in response to the assigned test current is stored in its memory. The central test means then recovers the trip times from the memories in the various overcurrent protection devices for evaluation. The assigned test currents provided by the central test means to the individual protection devices take into account the effects of any devices which affect fault currents such as power transformers, instrument transformers, motors, capacitors, or other devices in the power distribution system.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
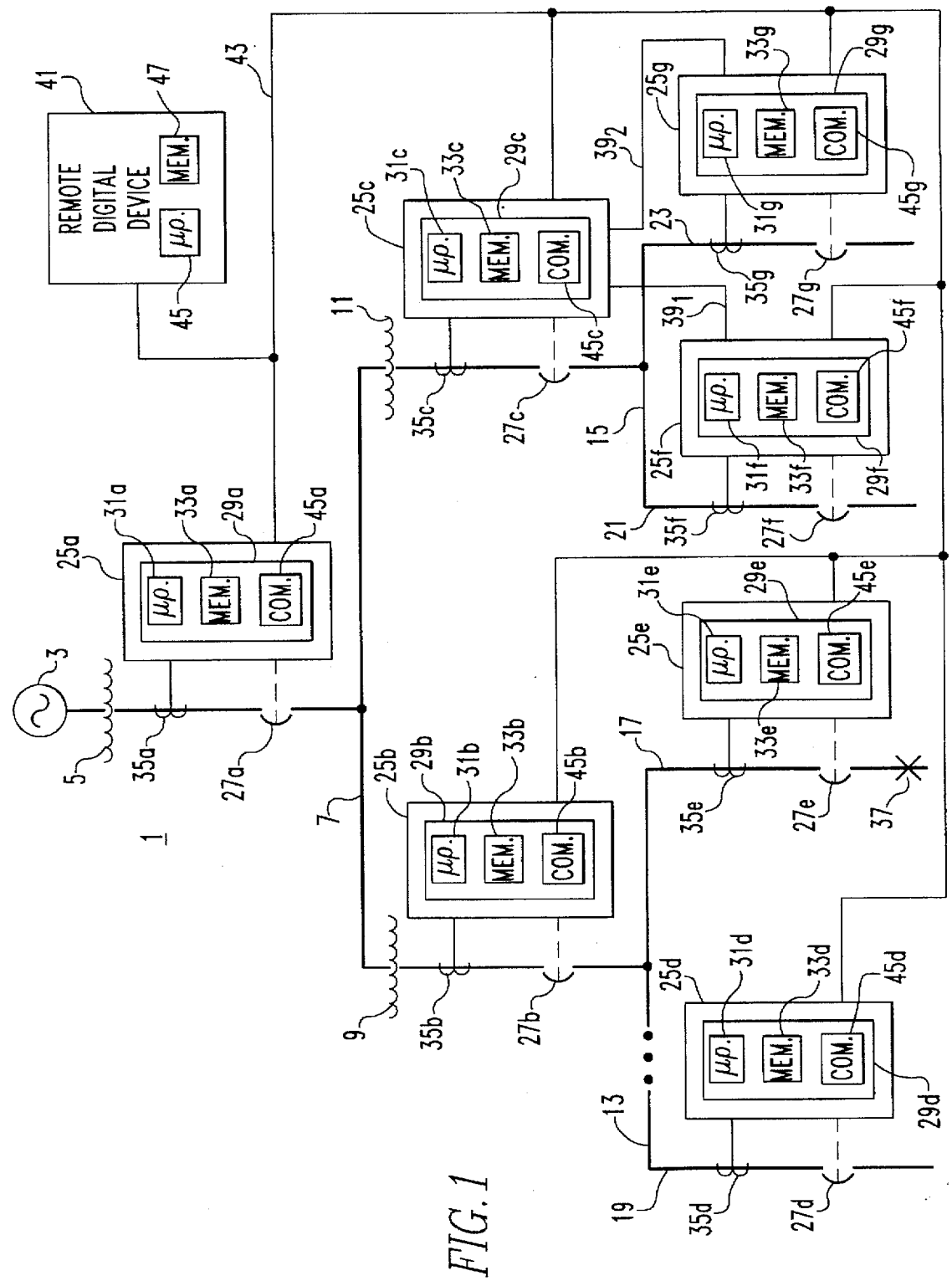
FIG. 1 is a schematic diagram of a power distribution system incorporating the invention to test the coordination between overcurrent protection devices in the system.

The invention will be described as applied to an electric power distribution system but it will be realized that it has application to other electric power systems where coordination of overcurrent protection devices is of interest. The exemplary electric power distribution system 1 to which the invention is applied is shown in FIG. 1.

The distribution system 1 includes a source 3 which provides power through a power transformer 5 to a main bus 7. The main bus 7 in turn supplies power through transformers 9 and 11 to busses 13 and 15. The bus 13 provides power to a number of distribution circuits 17 and 19. Likewise, the bus 15 supplies power to the distribution circuits 21 and 23. The busses 7–15 and distribution circuits 17–23 form a hierarchy of branches in the distribution system 1 with the main bus 7 being at the top of the hierarchy, and the distribution circuits 17-23 being at the lower end of the hierarchy.

Overcurrent protection devices 25a-25g are provided in the respective branches. In the exemplary distribution system 1, these protection devices 25 are circuit breakers with integral trip units, although it will be understood that other types of overcurrent protective devices such as protective relays would be used in conjunction with power circuit breakers in other power systems. Typically, the protective relays are used in electric power systems where the line voltage is above 1000 V. Each of the circuit breakers 25a-25g includes contacts 27a-27g which are operated by a trip unit 29a-29g. The exemplary trip units 29a-29g are electronic trip units which incorporate a microprocessor 31a-31g having a memory 33a-33g. The trip units 29a-29g sense the current in the associated branch through current transformers (CTs) 35a-35g. The distribution system 1 is three-phase, but it is shown in single line for clarity. Hence, each of the circuit breakers has a set of contacts 27 and a CT 35 for each phase, although again, only one is shown in FIG. 1.

The trip units 29a-29g provide overcurrent protection through implementation of predetermined current/time trip characteristics. These predetermined current/time trip characteristics of the various trip units 29a-29g are coordinated, as is well known, to minimize service interruption due to a fault. This coordination is implemented through a hierarchical arrangement of the current/time trip characteristics of the trip units of 29a-29g. In accordance with this arrangement, the current/time trip characteristics of the trip units 29 of the circuit breakers 25 lower in the hierarchy are selected to respond to a fault before those higher in the hierarchy. For example, if there is a fault at the location 37 in a lower branch 17 in the distribution system, the trip units 29e, 29b and 29a will all sense the fault. Obviously, if the trip unit 29a responds by tripping the circuit breaker 25a, the entire distribution system is deenergized. The objective is to have only the first circuit breaker above the fault respond, which in this case, is the circuit breaker 25e. In order to coordinate operation of the trip units 29e, 29b, and 29a, the current/time trip characteristic of trip unit 29e can be selected to respond to the fault at 37 before the trip unit 29b. Similarly, the current/time trip characteristic of the trip unit 29a is selected to allow the circuit breaker 25b to respond first to faults below both of these breakers.

It is also known to utilize zone interlocks to provide coordination among circuit breakers in a hierarchy of circuit branches. Thus, in the exemplary system, the trip units 29f and 29g generate zone interlock signals when they see a fault. These zone interlock signals are transmitted to the trip unit 29c of the circuit breaker 25c above them in the hierarchy through leads $39_1$ and $39_2$, respectively. The zone interlock signals prevent tripping of the circuit breaker 25c, giving the circuit breaker 25f or 25g time to respond to a fault below it. This zone interlock scheme allows the protection curves for the trip units 29f and 29g of the lower circuit breakers 25f and 25g to be closer to the protection curve for the trip unit 29c of the breaker 25c.

The system 1 in accordance with the invention includes a remote digital device 41 which communicates with the trip units 29 of the individual circuit breakers 25a through 25g over a communications link in the form of a network 43. Each of the protective devices 25a-25g includes a communications module 45a-45g which provides an interface with the network 43 for communication between the microprocessor 31a-31g and the remote digital device 41.

The remote digital device 41 may be a remote computer, which may be located for instance in a control room, through which an operator can monitor the operation of the system 1, and in particular, the overcurrent protection devices 25a-25g. The remote digital device 41 enables the operator to review the settings of the various overcurrent protection devices, retrieve information regarding trips or other events recorded by the overcurrent protection devices in their memories 33a-33g. In addition, the remote digital device can be used to adjust the settings of the trip units 29 particular overcurrent protection devices 25.

Figure 2:
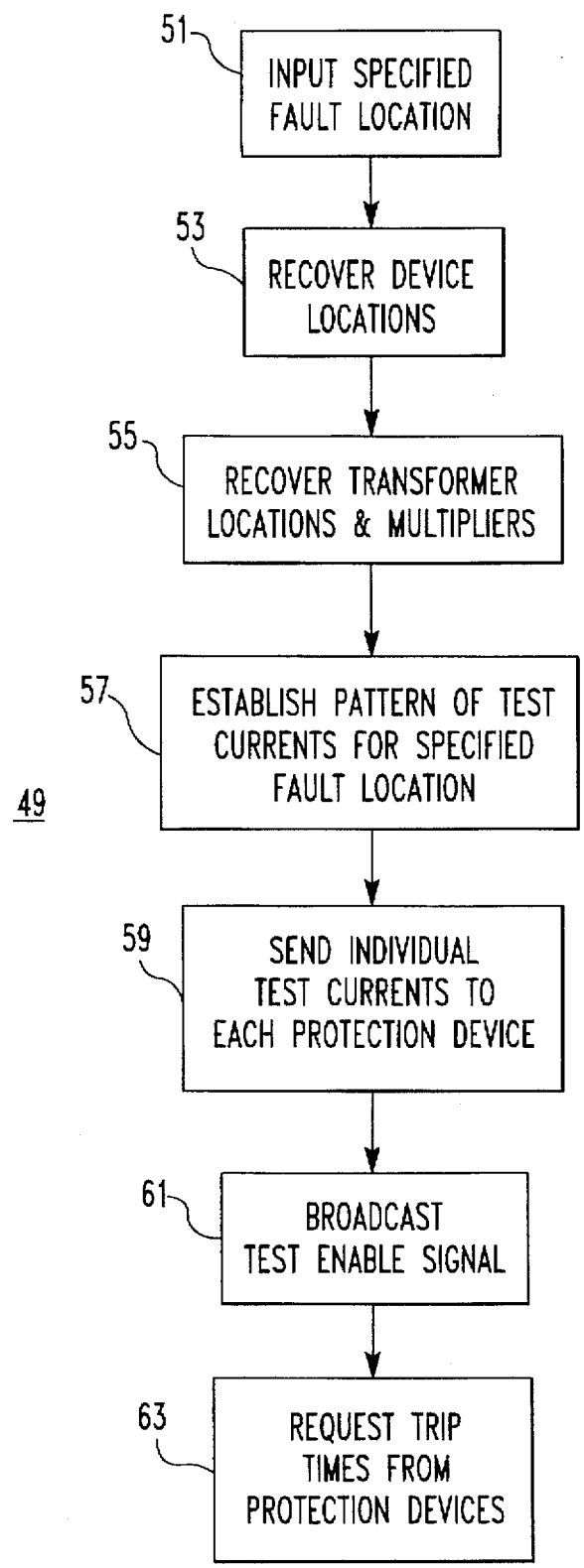
FIG. 2 is a flow chart of a routine used by the central tester which forms part of the system disclosed in FIG. 1.

In some instances the overcurrent protection devices 25a-25g are circuit breakers mounted in a panel board. Typically, these circuit breakers, while having very sophisticated trip units 29a-29g, are not provided with a user interface display. In such installations, a remote digital device 41 mounted on the panel board serves as a common user interface. In any event, whether the remote digital device 41 is a remote computer, a panel board interface, or some other central digital processor, it serves as a central tester in accordance with the invention. The remote digital device 41 includes a digital processor such as the microprocessor 45 and a memory 47. As shown in FIG. 2, the microprocessor 45 implements a routine 49 which first receives a specified fault location input by the user as indicated at 51. The routine then recovers from memory 47 the device locations in the power system at 53 along with the transformer locations and multipliers at 55. These are used to establish a pattern of test currents for the user specified fault location at 57. Separately addressed messages containing the assigned test current for each overcurrent protection device are then sent over the network at 59. After all of the assigned test currents have been distributed, a signal is broadcast over the network instructing all of the overcurrent protection devices 25 to initiate a test utilizing the previously transmitted assigned test currents as indicated at 61. Upon completion of the test, the central tester requests the trip times from the protection devices at 63 which can be used for analysis of the coordination of the protective devices.

Figure 3:
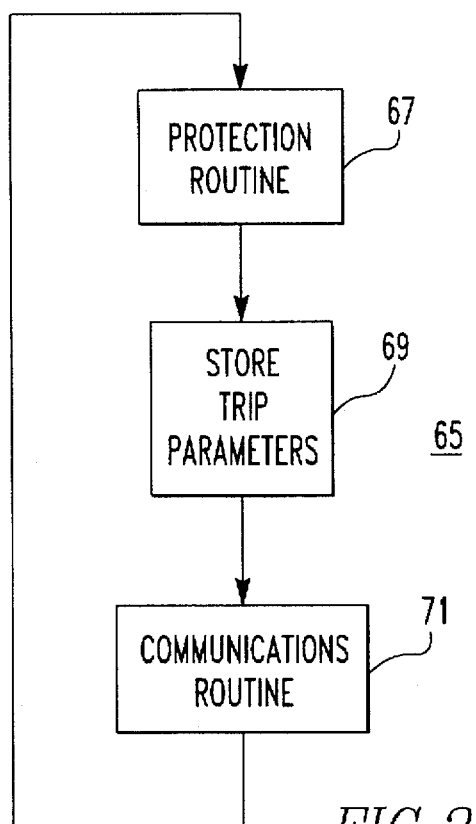
FIG. 3 is a flow chart illustrating the pertinent parts of a main routine used by the overcurrent protection devices which form part of the distribution system of FIG. 1.
Figure 4:
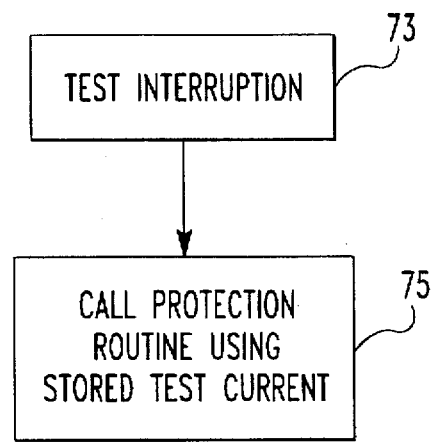
FIG. 4 is a flow chart of a test interrupt routine used by the overcurrent protection devices in accordance with the invention.

Upon receipt of the individual messages by the respective protection devices 25a-25g, the assigned test currents are stored in the memories 33a-33g of the trip units. As indicated in FIG. 3, the microprocessors 31a-31g of the protection devices continuously run a program 65 which includes calling the protection routine at 67. The protection routine implements the overcurrent/time trip characteristic established for the trip unit 29a-29g. If a trip signal is generated, the trip parameters are stored at 69 and in any event the communications routine is run at 71. When a broadcast signal is received from the central tester, an interrupt is generated which immediately initiates a test of the trip unit utilizing the assigned test current so that all of the units initiate the tests simultaneously. The test is preferably run without actually tripping the overcurrent protection device so that power is not interrupted. Thus, the test in accordance with the invention can be made on line. As shown in FIG. 4, the broadcast signal generates in all of the microprocessors 31a-31g a test interrupt at 73. This calls the protection routine 67 of FIG. 3 in each of the overcurrent protection devices using the stored test current, as indicated at 75.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. In combination:

an electric power system having a hierarchy of branches;

a plurality of overcurrent protection devices each in an assigned branch in said hierarchy of branches, and comprising trip means having an assigned overcurrent/time trip characteristic for generating a trip signal;

said assigned overcurrent/time trip characteristic of each protection device being assigned to coordinate operation of said plurality of protection devices such that a first protection device above a fault in said hierarchy of branches generates a trip signal first in response to said fault;

a communications link connected to said plurality of protection devices; and central test means initiating over said communications link simultaneous testing of said protection devices using a pattern of assigned test currents simulating a fault at a specified location in said hierarchy of branches.

2. The combination of claim 1 wherein said protection devices have memory means for storing said assigned test current and wherein said trip means includes test means implementing a test of said trip means using said assigned test currents to said protection devices over said communications link for storage in said memory means, and means broadcasting a test signal over said communications link to all of said protection devices actuating said test means to implement a test of said trip means using said assigned test current stored in memory.

3. The combination of claim 2 wherein said electric power system includes devices which have affects on fault current in selected ones of said hierarchy of branches and wherein said central test means includes means generating said pattern of assigned test currents taking into account said effects of said devices.

4. The combination of claim 3 wherein said trip means includes means recording in said memory means a trip time at which said overcurrent protection device trips in response to the assigned test current, and wherein said central test means comprises means recovering a trip time from said memory means in each overcurrent protection device over said communications link.

5. The combination of claim 4 wherein certain of said overcurrent protection devices include zone interlock means responsive to an assigned test current indicating a fault below said certain protection device in said hierarchy of branches blocking generation of a trip signal in an overcurrent protection device in a branch higher than said certain overcurrent protection device in said hierarchy of branches to give said certain overcurrent protection device time for its trip means to respond to said fault.

6. A method of testing overcurrent/time trip characteristic coordination of overcurrent protection devices in an electric power system comprising:

establishing a pattern of test currents for said overcurrent protection devices which simulates a fault at a specified location in said electric power system;

storing stored test currents assigned in accordance with said pattern of test currents in said overcurrent protection devices;

simultaneously testing said overcurrent protection devices by applying said stored test currents to said overcurrent protection devices simultaneously; and recording responses of said overcurrent protection devices to said stored test currents assigned in accordance with said pattern of test currents.

* * * * *